United States Patent
Ogawa et al.

(10) Patent No.: US 7,307,047 B2
(45) Date of Patent: Dec. 11, 2007

(54) LEPIDOCROCITE POTASSIUM MAGNESIUM TITANATE, METHOD FOR MANUFACTURING THE SAME AND FRICTION MATERIAL

(75) Inventors: Hiroshi Ogawa, Tokushima (JP); Shigeo Takahashi, Tokushima (JP); Nobuki Itoi, Tokushima (JP); Kousuke Inada, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 412 days.

(21) Appl. No.: 10/343,005

(22) PCT Filed: Jul. 27, 2001

(86) PCT No.: PCT/JP01/06492

§ 371 (c)(1),
(2), (4) Date: Jan. 27, 2003

(87) PCT Pub. No.: WO02/10069

PCT Pub. Date: Feb. 7, 2002

(65) Prior Publication Data

US 2003/0147804 A1 Aug. 7, 2003

(30) Foreign Application Priority Data

Jul. 31, 2000 (JP) ............................. 2000-231514

(51) Int. Cl.
*C09K 3/14* (2006.01)
*C01G 23/00* (2006.01)
*F16D 69/02* (2006.01)

(52) U.S. Cl. ....................... 508/108; 423/598

(58) Field of Classification Search ............... 423/598; 106/36; 508/108

See application file for complete search history.

(56) References Cited

U.S. PATENT DOCUMENTS 6,432,187 B1 * 8/2002 Ogawa et al. ................ 106/36

FOREIGN PATENT DOCUMENTS

JP 3027577 * 4/2000

OTHER PUBLICATIONS

Patent Abstracts of Japan, vol. 0176, No. 74 (C-1140), Dec. 10, 1993 & JP 5 221795 A, Aug. 31, 1993 and abstract.
Nalbandyan, V.B., et al.: "Rearrangement of the Structure of Layered Titanates During Ion Exchange", Chemical Abstracts + Indexes, American Chemical Society, vol. 107, No. 18, 1987, p. 907, no month.
Patent Abstracts of Japan, JP 03 027577B, Jan. 28, 2000, the whole document.
JP 05-229900, dated Sep. 7, 1993, and English Abstract Thereof.
JP 05-221795, dated Aug. 31, 1993, and English Abstract Thereof.

* cited by examiner

*Primary Examiner*—Steven Bos
(74) *Attorney, Agent, or Firm*—Townsend & Banta

(57) ABSTRACT

Lepidocrocite potassium magnesium titanate having a composition represented by the formula $K_{0.2-0.7}Mg_{0.4}Ti_{1.6}O_{3.7-4}$ and obtainable by subjecting an aqueous slurry of lepidocrocite potassium magnesium titanate having a composition represented by the formula $K_{0.8}Mg_{0.4}Ti_{1.6}O_4$ to an acid treatment and subsequent calcination.

17 Claims, 9 Drawing Sheets

LEPIDOCROCITE POTASSIUM MAGNESIUM TITANATE, METHOD FOR MANUFACTURING THE SAME AND FRICTION MATERIAL

TECHNICAL FIELD

This invention relates to lepidocrocite potassium magnesium titanate, a method for manufacturing the same and a friction material.

BACKGROUND ART

Friction materials as heretofore used to form braking members utilize asbestos in the form of being dispersed in and integrated by organic or inorganic binders. However, these show insufficient heat resistance and frictional wear properties, e.g., friction coefficient and wear resistance, that tend to drop in the high-temperature range, resulting in the increased occurrence of a fading phenomenon when braking is effected. When braking is effected, the contact of such friction materials with a high-speed brake disc causes the frequent occurrence of "braking noise". Also, asbestos is a known cancer-causing substance and is readily made into dusts. In view of the environmental hygienic problem that workers may inhale asbestos during operation, the use of asbestos has been increasingly self-restrained. Under these circumstances, it has been strongly demanded to develop asbestos substitutes.

In response to such demands, friction materials using non-carcinogenic potassium titanate fibers as a friction control agent have been proposed and achieved a widespread use for incorporation primarily in automobile braking pads. The friction materials containing potassium titanate fibers exhibit superior sliding properties and good braking effect. Nevertheless, they provide little damage to braking discs, which is a very favored advantage thereof. However, they suffer from insufficient wear resistance, particularly in the high-temperature range, and a slightly faster wear rate. Also, they have not yet offered a sufficient solution to "braking noise" developed in braking devices. Further, the potassium titanate fibers, because of their fibrous form, are bulky and poor in flowability, leading to their tendency to deposit on a wall of a feed passage and block the passage during manufacture of friction materials, which has been a problem.

Japanese Patent Laying-Open No. Hei 5-221759 describes potassium magnesium titanate having an orthorhombic layer structure, i.e., lepidocrocite potassium magnesium titanate, with a composition represented by the formula $K_{0.8}Mg_{0.4}Ti_{1.6}O_4$, a major diameter (length) of 5 mm, a minor diameter (breadth) of 2-3 mm and a thickness of 0.1-0.5 mm. Also, Japanese Patent Registration No. 3027577 describes the utility of lepidocrocite potassium magnesium titanate as a friction control agent for friction materials. Such friction materials exhibit stable frictional wear properties in the low-to high-temperature ranges. However, since a contact temperature between the brake disc and brake pad is high and reaches 1,000° C. or over, their heat resistance sometimes becomes insufficient for the long-term continuous use, e.g., for over several tens hours, possibly resulting in the reduced wear resistance in the high-temperature range and the increased wear amount. There accordingly remains a need for development of friction materials with further improved heat resistance and frictional wear properties.

DISCLOSURE OF THE INVENTION

It is an object of the present invention to provide novel lepidocrocite potassium magnesium titanate that, when used as a friction control agent, further improves heat resistance and frictional wear properties, a method for manufacturing the same and a friction material using the same.

After energetic and continued studies in the attempt to accomplish the above-described object, the inventors of the present invention have completed the present invention by successfully obtaining novel lepidocrocite potassium magnesium titanate suitable for use as a friction control agent, as well as friction materials which show remarkably improved heat resistance and frictional wear properties and also enjoy satisfactory productivity.

That is, this invention is concerned with lepidocrocite potassium magnesium titanate with a composition represented by the formula $K_{0.2-0.7}Mg_{0.4}Ti_{1.6}O_{3.7-4}$, method for manufacturing the same and friction materials using the same.

The manufacturing method of the present invention is characterized as including the steps of adding an acid to an aqueous slurry of lepidocrocite potassium magnesium titanate having a composition represented by the formula $K_{0.8}Mg_{0.4}Ti_{1.6}O_4$ while adjusting the slurry to a pH of 6-9, preferably 6.5-8.5, more preferably 6.5-7.5, separating solids from the slurry and then calcining the solids.

The friction control agent of the present invention is characterized as comprising lepidocrocite potassium magnesium titanate either of the present invention or made by the practice of the manufacturing method of the present invention.

The friction material of the present invention is characterized as containing 1-80% by weight of lepidocrocite potassium magnesium titanate either of the present invention or made by the practice of the manufacturing method of the present invention.

Lepidocrocite potassium magnesium titanate of the present invention (hereinafter abbreviated as "KTMO" unless otherwise particularly specified) has a layer structure and shows stable heat resistance and frictional wear properties regardless of temperature. Also, since it does not exist in a fibrous form, unlike potassium titanate fibers, it is very unlikely to block a feed passage during manufacture and worsen a working environment due to the presence of respirable fibers.

Friction materials containing KTMO as a friction control agent are able to exhibit extremely stable heat resistance and frictional wear properties (such as friction resistance and frictional coefficients) over the low to high-temperature ranges. Their heat resistance and frictional wear properties are maintained extremely stable even during a long-term use over several tens hours.

Accordingly, the use of the friction material of this invention for braking members, e.g., clutch facings, brake linings and disc pads incorporated in braking devices as of automobiles, aircrafts, railway vehicles and industrial apparatuses not only improves and stabilizes their braking functions but also extends their service lives.

The reason why the friction materials containing KTMO of the present invention provide such superior results is not clear but presumably attributed to a higher melting point of KTMO of the present invention relative to prior art lepidocrocite potassium magnesium titanate represented by the composition $K_{0.8}Mg_{0.4}Ti_{1.6}O_4$ and also to the structural difference therebetween.

The lepidocrocite potassium magnesium titanate (KTMO) of the present invention generally has a composition represented by the formula:

$$K_{0.2-0.7}Mg_{0.4}Ti_{1.6}O_{3.7-4} \quad (1)$$

and has an orthorhombic layer structure. In view of frictional wear properties, the preferred KTMO is represented by the formula $$K_{0.2-0.5}Mg_{0.4}Ti_{1.6}O_{3.7-4} \quad (2)$$

and has a potassium content within the range of 0.2-0.5 moles. KTMO of the present invention generally has a flaky or sheetlike shape as similar to mica, pulverized pieces of shells and the like.

The virtual correspondence of the X-ray diffraction chart (FIG. 1) for KTMO of the present invention to the X-ray diffraction chart (ICDD card No. 35-0046, FIG. 2) for the prior art lepidocrocite potassium magnesium titanate (hereinafter referred to as "KTMO-a") represented by the formula:

$$K_{0.8}Mg_{0.4}Ti_{1.6}O_4 \quad (a)$$

suggests that KTMO of the present invention is probably maintained in a crystal condition that lacks a part of potassium but retains the orthorhombic layer structure.

As potassium is generally eliminated in the form of $K_2O$, the composition of the lepidocrocite potassium magnesium titanate of the present invention is considered to be represented by the formula:

$$K_xMg_{0.4}Ti_{1.6}O_4\text{-}y$$

where x satisfies x=0.2–0.7 and y satisfies y=(0.8–x)/2.

However, it is difficult to measure accurately the oxygen composition ratio in the actually manufactured compound. Therefore, in this technical field, assuming that oxygen is not eliminated, the compound may be represented by the formula:

$$K_xMg_{0.4}Ti_{1.6}O_4$$

which should be regarded as the same compound represented by the above formula.

Also, thermal analysis (TG DTA, FIG. 3: KTMO of the present invention, FIG. 4: KTMO-a) revealed a melting point of about 1,375° C. for the substance KTMO of the present invention and a melting point of about 1,300° C. for the known substance KTMO-a. In this regard, they are evidently dissimilar inorganic substances.

An arithmetic mean of major and minor diameters ((major diameter+minor diameter)/2), a proportion of a major to minor diameter (major diameter/minor diameter) and a mean thickness for KTMO of the present invention spread over a wide range of values and may be suitably chosen depending upon the end use contemplated. In order to impart satisfactory heat resistance and sliding properties to friction materials containing KTMO as friction control agent, KTMO may be used having an arithmetic mean of major and minor diameters generally in the approximate range of 0.1-100 μm, preferably in the approximate range of 1-30 μm, a proportion of a major to minor diameter of from 1 to below 5, preferably from 1 to below 3, and a thickness generally in the range of 50-5,000 nm, preferably in the range of 200-2,000 nm These values for major and minor diameters and thickness are determined by a scanning electron microscope. The arithmetic mean of major and minor diameters, proportion of a major to minor diameter and mean thickness are arithmetic averages of values determined for about 20 particles, respectively. The major diameter is the longest diameter of each flake particle in its sheetlike flat plane. The minor diameter is the shortest diameter of each flake particle in its sheetlike flat plane.

The particularly preferred KTMO has an arithmetic mean of major and minor diameters generally in the approximate range of 0.1-100 μm, a proportion of a major to minor diameter of from 1 to below 5 and a thickness generally in the range of 50-5,000 nm, and exists in the form of flakes.

KTMO of the present invention can be manufactured, for example, by adding an acid to an aqueous slurry of KTMO-a, mixing them, separating solids from the slurry and calcining the solids.

KTMO-a can be obtained, for example, by mixing sources of titanium, potassium and magnesium, adding a flux and, subsequnet to thorough mixing, calcining the mixture at a temperature of 1,000-1,100° C. for a period of 1-8 hours.

The titanium source can be optionally chosen from titanium-containing compounds, specific examples of which include titanium oxide, rutile ore, titanium hydroxide wet cake, water-containing titania and the like. Such titanium sources may be used alone or in combination.

The potassium source can be chosen from compounds which produce potassium oxide when exposed to heat, specific examples of which include potassium oxide, potassium carbonate, potassium hydroxide, potassium nitrate and the like. Such potassium sources may be used alone or in any combination. Also, the potassium source may be used in combination with a small amount of one or more of oxides, carbonates, hydroxides and nitrates of any other alkaline metal.

Examples of magnesium sources include magnesium hydroxide, magnesium carbonate, magnesium fluoride and the like. Such magnesium sources may be used alone or in any combination.

The titanium, potassium and magnesium sources are mixed in the standard ratio of Ti:K:Mg=4:2:1 (molar ratio), with each being permitted to deviate within about 5%. However, a large deviation from the specified ratio sometimes results in the unfavorable deposition of a side product, $K_2MgTi_7O_{16}$, which is not sheetlike.

Examples of fluxes include potassium chloride, potassium fluoride, potassium molybdenate, potassium tangstenate and the like. Among those fluxes, potassium chloride is particularly preferred. The flux is added to the raw material in the molar ratio (raw material:flux) of 3:1-3:15, preferably 3:3-3:10. Lower loadings of the flux increase an economical advantage. However, if the flux loading is excessive, the unfavorable collapse of a sheetlike crystal may result.

Calcination can be achieved using an optional technique such as an electric furnace, muffle furnace or the like. In the mass production, a tunnel kiln may preferably be used to calcine the raw material previously pressed into a bricklike or cylindrical shape. Preferably, calcination is performed at a temperature between 1,000-1,100° C. for a retention period of 1-24 hours. Temperature may be raised or lowered at any rate, but generally preferably at 3-7° C./min. The higher calcination temperatures result in larger-scale sheetlike products. However, if it exceeds 1,100° C., the product shape may be impaired due to fusion, which is an unfavorable result. The longer retention period increases the size of resulting particles. After calcination, the product may be wet disintegrated. Specifically, it may be crushed and ground using a jaw crusher, a bin mill and the like, dispersed in water and stirred in the form of a 5-10 wt. % slurry. When needed, this slurry may be further subjected to a sequence of classifying filtering and drying to obtain a sheetlike potassium magnesium titanate (KTMO-a).

The concentration of the aqueous slurry of KTMO-a is not particularly specified and may be suitably chosen from a wide range. In view of workability, the aqueous slurry may be maintained at a concentration of about 1-30 weight %, preferably about 2-15 weight %.

The acid used is not particularly specified in type and can be chosen from known acids, examples of which include inorganic acids such as sulfuric acid, hydrochloric acid and nitric acid; organic acids such as acetic acid; and the like. Such acids may be used in combination, when needed. The acid may be added to the aqueous slurry in the effective amount to maintain the aqueous slurry at a pH of 6-9, preferably at a pH of 6.5-8.5, more preferably at a pH of 6.5-7.5. The pH measurement of the aqueous slurry is performed after addition of the acid and following about 1-5 hours of stirring. The acid is generally used in the form of an aqueous solution. The concentration of the aqueous acid solution is not particularly specified and may be suitably chosen from a wide range. It may be generally maintained in the approximate range of 1-80 weight %.

After the pH of the aqueous slurry is adjusted to fall within the above-specified range, the solids present therein is separated by a conventional separating means such as filtering, centrifuging or the like. The separated solids may be washed with water, if necessary.

The solids is then calcined. Generally, calcination is carried out at a temperature of about 400-700° C. and completes after about 1-12 hours. After calcination, the resulting powder may be pulverized or passed through a screen for disintegration.

The above-described procedure results in obtaining KTMO of the present invention.

The present invention also provides a friction material containing KTMO as a friction control agent. The friction material of the present invention contains a binder and a friction control agent as essential components.

Any binder which is conventionally used in the friction material field can be used. Examples of binders include organic binders and inorganic binders. Examples of organic binders include thermosetting resins such as a phenol resin, formaldehyde resin, melamine resin, epoxy resin, acrylic resin, aromatic polyester resin and urea resin; elastomers such as a natural rubber, nitrile rubber, butadiene rubber, styrene butadiene rubber, chloroprene rubber, polyisoprene rubber, acrylic rubber, high styrene rubber and styrene propylene diene copolymer; thermoplastic resins such as a polyamide resin, polyphenylene sulfide resin, polyether resin, polyimide resin, polyether ether ketone resin and thermoplastic liquid crystal polyester resin; and the like. Examples of inorganic binders include an alumina sol, silica sol, silicone resins and the like. The above-listed binders may be used alone or in any combination, if compatible.

Used for a friction control agent is KTMO of the present invention as represented by the above-specified formula (1).

The friction material of the present invention may further contain a fibrous substance. Any fibrous substance which has been conventionally used in the art is applicable. Examples of fibrous substances include resin fibers such as aramid fiber, metal fibers such as steel and brass fibers, carbon fibers, glass fibers, ceramic fibers, rock wool, wood pulp and the like. These fibrous substances may be used alone or in combination. Also, these fibrous substances may be subjected to a surface treatment using a silane coupling agent such as an aminosilane, epoxysilane or vinylsilane coupling agent, a titanate coupling agent, phosphate ester or the like, for purposes as of improving their dispersion properties and adhesion to binders.

The friction material of the present invention may also contain a friction control agent conventionally used in the art, within the range that does not impair the favored properties of the friction material, examples of which include organic powders such as natural or synthetic rubber powders, either vulcanized or unvulcanized, cashew resin powders, resin dusts and rubber dusts; inorganic powders such as carbon black, graphite powder, molybdenum disulfide, barium sulfate, calcium carbonate, clay, mica, talc, diatomite, antigorite, sepiolite, montmorillonite, zeolite, sodium trititanate, sodium hexatitanate, potassium hexatitanate and potassium octatitanate; metal powders such as copper, aluminum, zinc and iron; oxide powders such as alumina, silica, chromium oxide, titanium oxide and iron oxide; and the like. These conventional friction control agents may be used alone or in any combination thereof.

The friction material of the present invention may further contain one or more of a rust-preventive agent, lubricant and abrasive.

The components of the friction material of the present invention can be blended in the proportions that can be suitably chosen from a wide range depending upon various conditions including the types of the binder, optional fibrous substance, conventional friction control agent and other additives used, the sliding and mechanical properties sought for the resulting friction materials, the end uses contemplated and the like. Generally, the friction material may contain 5-60 weight % (preferably 10-40 weight %) of a binder, 1-80 weight % (preferably 3-50 weight %) of a friction control agent (inclusive of a conventional friction control agent), up to 60 weight % (preferably 1-40 weight %) of a fibrous substance and up to 60 weight % (preferably 5-50 weight %) of other additives, based on the total amount of the friction material.

The preferred friction material contains the fibrous substance, together with the binder and friction control agent, as essential components.

The friction material of the present invention can be manufactured by various techniques known in the art as being useful for manufacture of friction materials. To illustrate one technique, a fibrous substance, if needed, is dispersed in a binder, a friction control agent and other optional components are subsequently added to the binder, either as a mixture or separately, and the resulting mixture is brought into a mold where it is integrated by application of heat and pressure.

Alternatively, a technique may be used whereby the binder is melt kneaded in a twin screw extruder into which the friction control agent, optional fibrous substance and other components, either as a mixture or separately, are fed through a hopper and the resulting extrudate is machined into a desired shape.

Also alternatively, a technique can be used whereby the fibrous substance, if necessary, is dispersed in the binder to which the friction control agent and other optional components are subsequently added to form a mixture, the mixture is dispersed such as in water and wet laid on a net and then dewatered into a sheet, the sheet is pressed and heated for integration by a press machine, and the resulting product is properly cut and polished into a desired shape.

BEST MODES FOR CARRYING OUT THE INVENTION

The following Examples, Comparative Examples and Test Examples specifically illustrate the present invention. In the Examples, "parts" and "%" mean "parts by weight" and "% by weight", respectively.

EXAMPLE 1

(1) Synthesis of KTMO-a 1473 g of titanium oxide, 638 g of potassium carbonate, 1,003 g of potassium chloride, 279 g of magnesium hydroxide and further 200 ml of water as a binder were mixed. The mixture was pressed at a pressure of 14.7 MPa into a block shape by a hydropressing machine (manufactured by Yamamoto Tekkosho, Co., Ltd.). This block was calcined at 1,050° C. for 1 hour in an electric furnace (manufactured by Advantech Toyo Co., Ltd.) and then cooled gradually. The calcined product was pulverized to obtain a white powder with an arithmetic mean of major and minor diameters of 3 μm, a mean thickness of 300 nm and a proportion of a major to minor diameter of 1.5. The white powder was identified as having a composition of $K_{0.8}Mg_{0.4}Ti_{1.6}O_4$ by fluorescent X-ray analysis using an FP (fundamental parameter) method.

Figure 2:
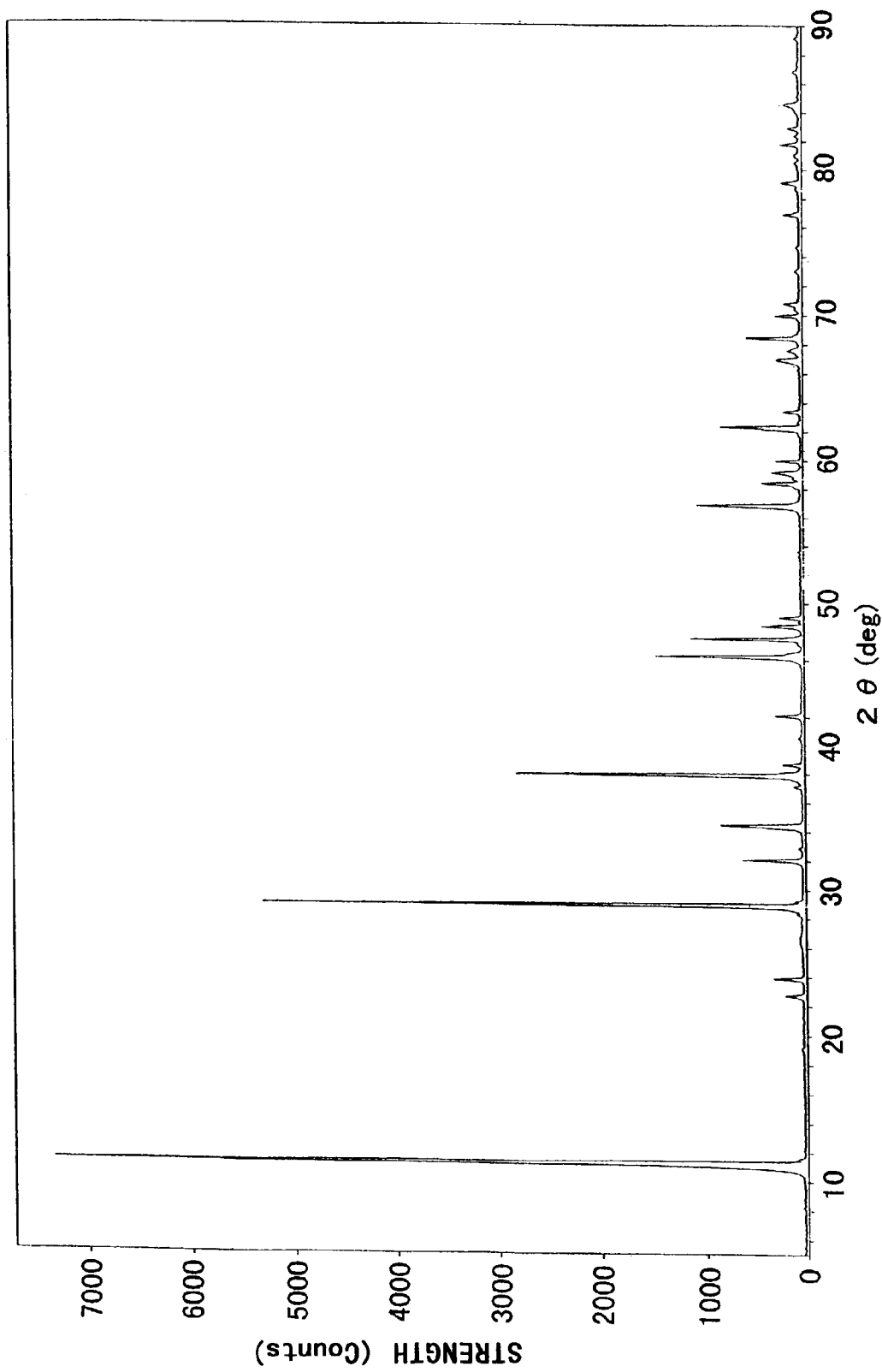
FIG. 2 is an X-ray diffraction chart of lepidocrocite potassium magnesium titanate previously known in the art.
Figure 4:
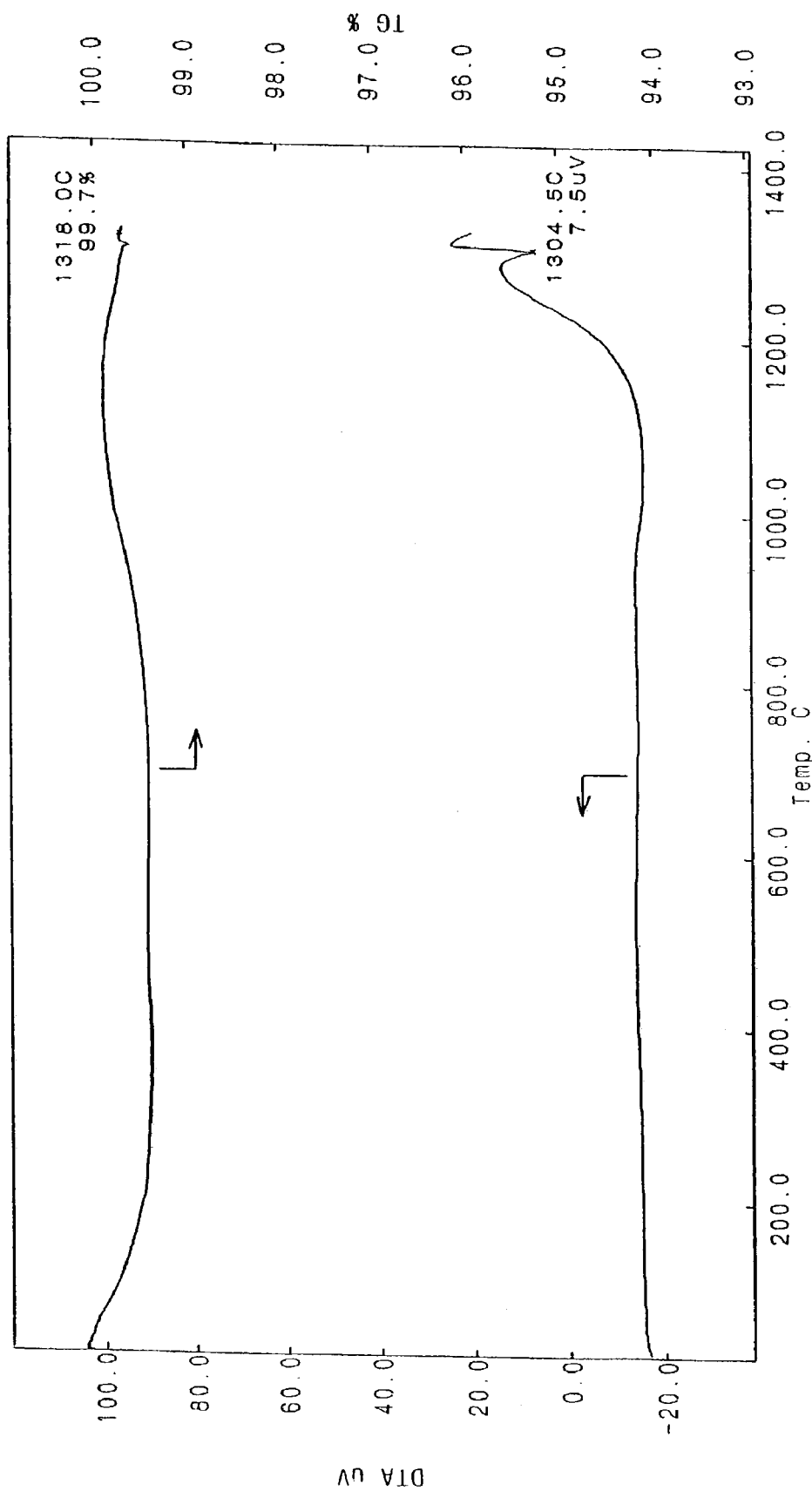
FIG. 4 is a thermal analysis chart of lepidocrocite potassium magnesium titanate previously known in the art.

FIG. 2 is an X-ray diffraction chart of the white powder obtained. The diffraction peaks were found to correspond reasonably to those given in ICDD card No. 35-0046. FIG. 4 is a thermal analysis chart of the white powder obtained and shows TG (thermogravimetric analysis) and DTA (differential thermal analysis) curves. As can be seen from FIG. 4, a melting point was found to be about 1,300° C.

(2) Synthesis of KTMO of the Present Invention

The above-obtained KTMO-a was used to prepare 80 liters of a 2% aqueous slurry to which 526 g of a 76% aqueous solution of sulfuric acid was subsequently added. The slurry was stirred for 2 hours and then adjusted to a pH of 7.5. This aqueous slurry was subjected to treatment by a centrifugal separator. The resulting cake (solids) was dispensed, dried at 110° C. for 5 hours and then calcined at 600° C. for 12 hours in an electric furnace. The calcined product was cooled gradually and then passed through a 20 mesh screen to obtain a white powder with an arithmetic mean of major and minor diameters of 3 μm, a mean thickness of 300 μm and a proportion of a major to minor diameter of 1.5. The white powder was identified as having a composition of $K_{0.4}Mg_{0.4}Ti_{1.6}O_{3.8}$ by fluorescent X-ray analysis using an FP (fundamental parameter) method.

Figure 1:
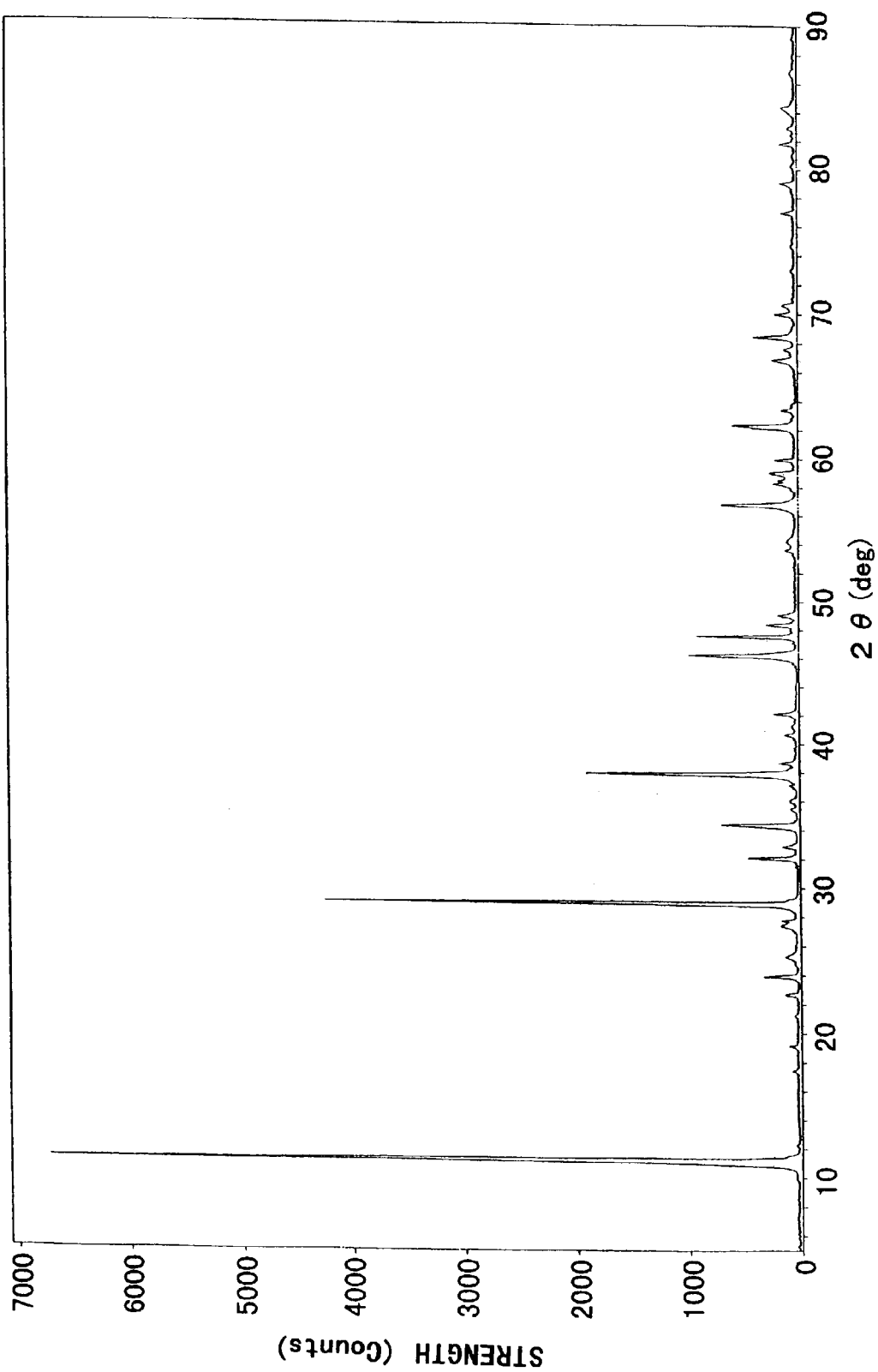
FIG. 1 is an X-ray diffraction chart of lepidocrocite potassium magnesium titanate of the present invention.

FIG. 1 is an X-ray diffraction chart of the white powder obtained. The diffraction peaks were found to show resemblance to those of KTMO-a shown in FIG. 2 and correspond reasonably to those given in ICDD card No. 35-0046. These suggest that, like KTMO-a, KTMO of the present invention most probably has an orthorhombic layer structure.

Figure 3:
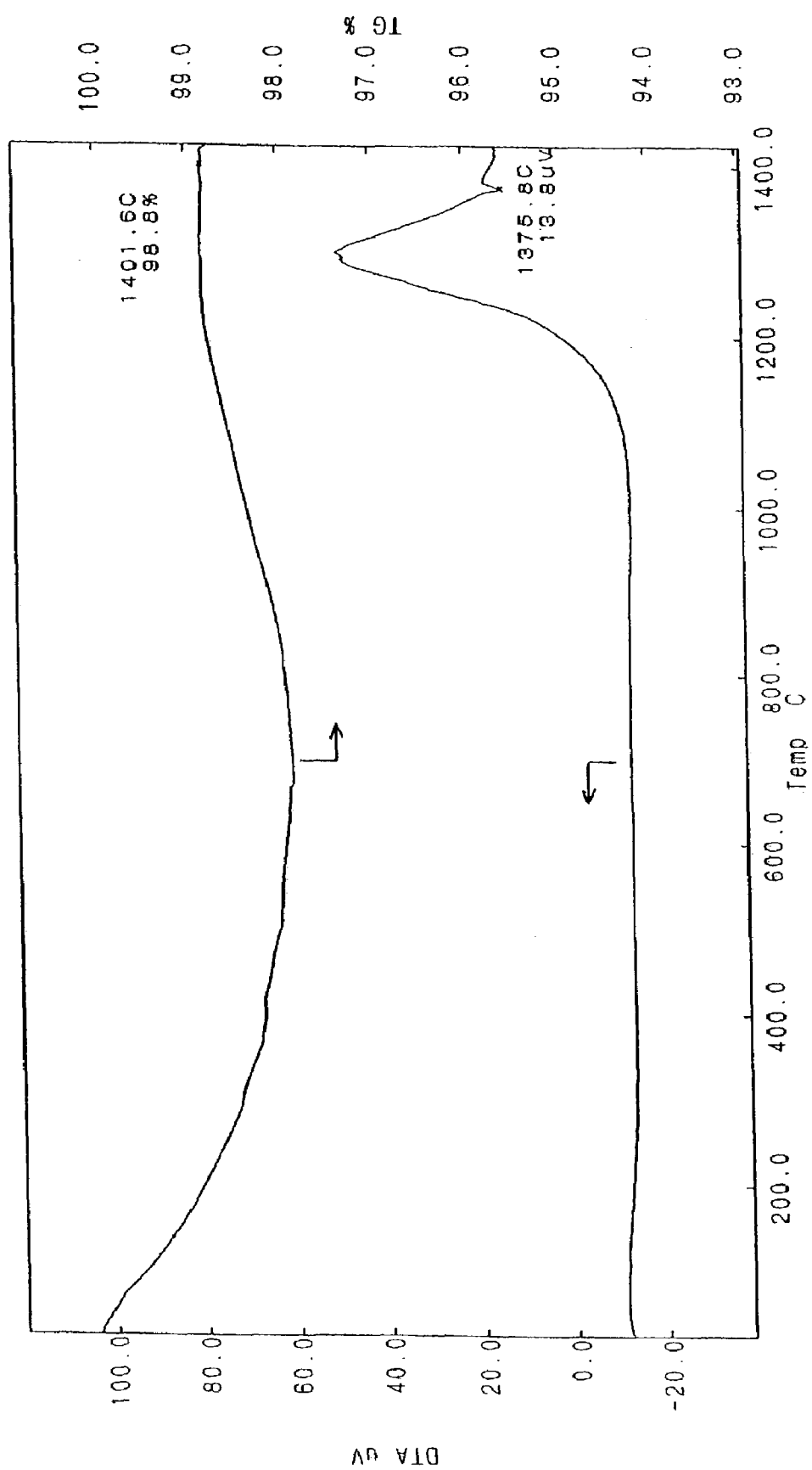
FIG. 3 is a thermal analysis chart of lepidocrocite potassium magnesium titanate of the present invention.

FIG. 3 is a thermal analysis chart of the white powder obtained. As can be seen from FIG. 3, a melting point was found to be about 1,375° C.

It is therefore evident that KTMO of the present invention is a compound clearly distinct from KTMO-a prior to being subjected to an acid treatment.

Figure 8:
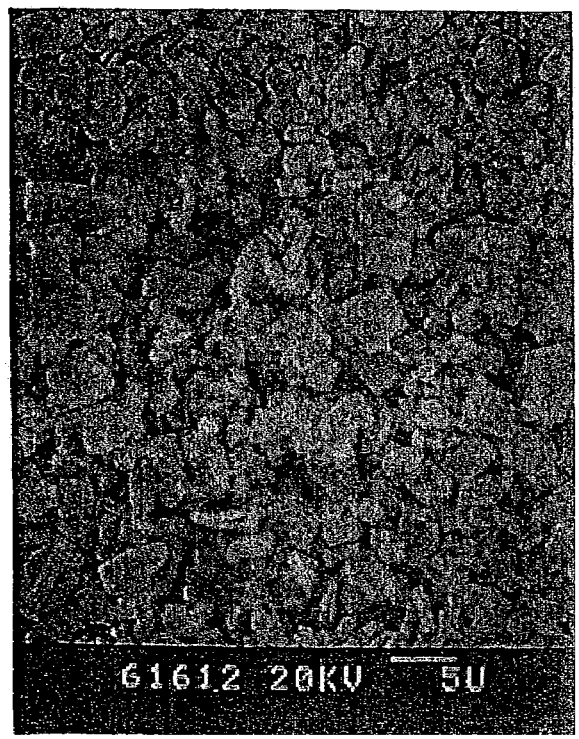
FIG. 8 is a photomicrograph (at a magnification of 2,000×) of lepidocrocite potassium magnesium titanate of the present invention when taken using a scanning electron microscope.
Figure 9:
FIG. 9 is a photomicrograph (at a magnification of 2,000×) of lepidocrocite potassium magnesium titanate previously known in the art when taken using a scanning electron microscope.

A photomicrograph of KTMO when taken using a scanning electron microscope is shown in FIG. 8. A photomicrograph of KTMO-a when taken using a scanning electron microscope is shown in FIG. 9.

EXAMPLE 2

20 parts of KTMO ($K_{0.4}Mg_{0.4}Ti_{1.6}O_{3.8}$) obtained in Example 1, 10 parts of aramid fibers (product name: KEVLAR PULP®, a synthetic aramid, having a mean fiber length of 3 mm), 20 parts of a phenol resin (binder) and 50 parts of barium sulfate were mixed. The mixture was preformed at a pressure of 29.4 MPa at an ambient temperature for 1 minute, integrated in a mold at a pressure of 14.7 MPa at a temperature of 170° C. for 5 minutes and heat-treated at 180° C. for subsequent 3 hours. The molded product was removed from the mold and polished to fabricate a disc pad A (JIS D 4411 test piece).

COMPARATIVE EXAMPLE 1

The procedure of Example 2 was repeated, except that each of the below-specified fibrous substances (friction control agents) B-E was used in the amount of 30 parts instead of using 30 parts of KTMO and aramid fibers, to fabricate disc pads B-E.

Fibrous substance B: potassium hexatitanate fibers (having a section diameter of 5-10 μm and an aspect ratio of 5)

Fibrous substance C: asbestos fibers (6 Class)

Fibrous substance D: large-size potassium hexatitanate fibers (having a section diameter of 20-50 μm and a length of 100-300 μm)

Fibrous substance E: minute needle-like potassium octatitanate fibers (having a section diameter of 0.2-0.5 μm and a length of 5-15 μm)

COMPARATIVE EXAMPLE 2

The procedure of Example 2 was followed, except that KTMO-a was used in the place of KTMO obtained in Example 1, to fabricate a disc pad F.

TEST EXAMPLE 1

Frictional Wear Test

Figure 5:
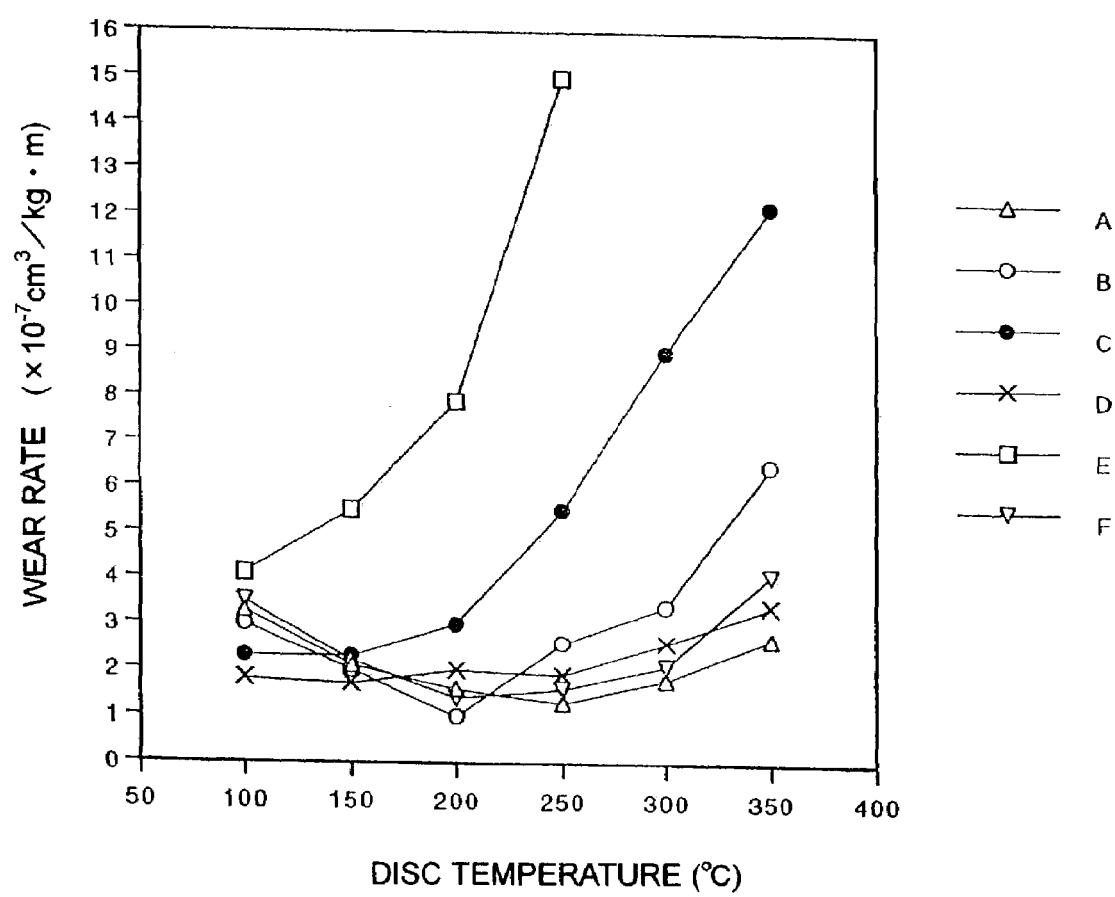
FIG. 5 is a graph showing a relationship between a disc pad temperature and a wear rate for the disc pads A-F.
Figure 6:
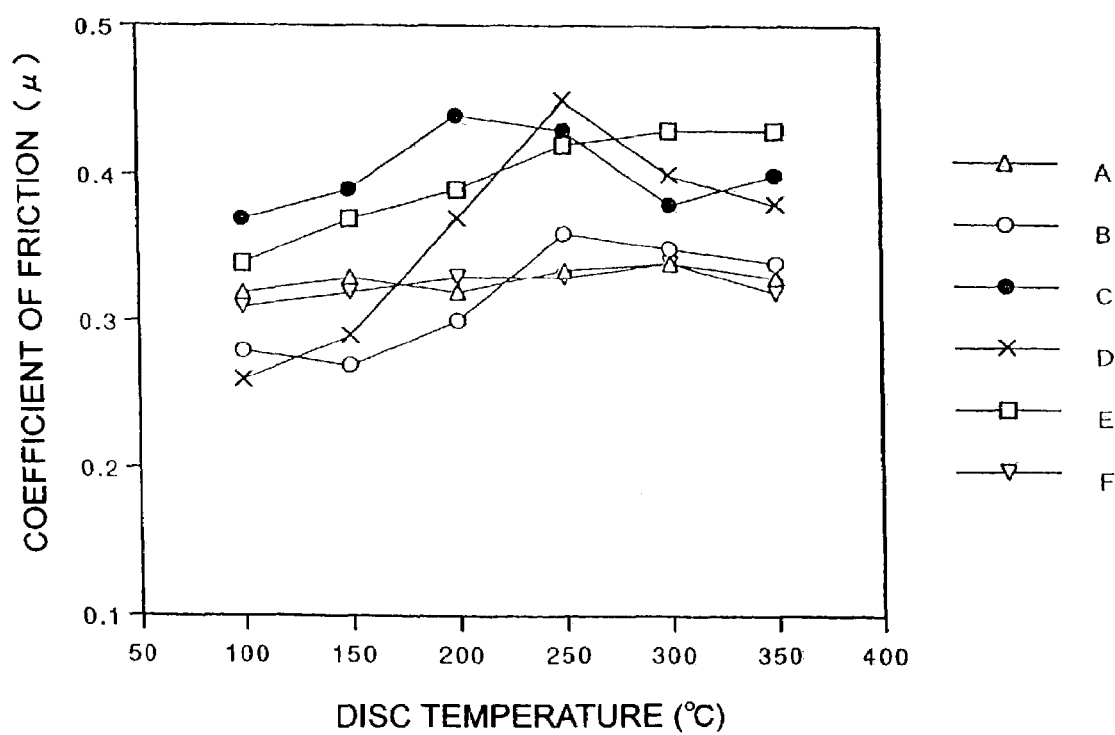
FIG. 6 is a graph showing a relationship between a disc pad temperature and a friction coefficient for the disc pads A-F.

For the disc pads obtained in Example 2 and Comparative Examples 1 and 2, a constant-rate frictional wear test (friction disc surface: made of FC 25 gray cast iron, surface pressure: 0.98 MPa, friction speed: 7 m/sec) was conducted according to the standards described in JIS D 4411 "Automobile Friction Lining" to measure a wear rate (cm3/kgm) and a friction coefficient ($\mu$). The results are given in FIGS. 5 and 6.

Disc Pads A (Friction Material of the Present Invention) and F

Evidently, they exhibit the superior wear resistance over a low to high temperature range to the disc pad C (containing asbestos fibers) and also show coefficients of friction relatively stabilized against a temperature change.

Disc Pad D (Containing Large-Size Potassium Hexatitanate Fibers)

Although showing stable wear properties comparable to the friction material of the present invention, it exhibits the inferior thermal stability as to friction coefficient compared to the friction material of the present invention.

Disc Pad E (Containing Minute Needle-Like Potassium Titanate Fibers)

Although it has a high friction coefficient and is little affected by temperature to thereby show a superior stability, its wear amount increases with a rise of temperature.

TEST EXAMPLE 2

Frictional Wear Test

For the disc pads A and F, a constant-rate frictional wear test was performed for 100 hours in the same manner as in Test Example 1 to measure a wear rate (cm3/kgm) at each temperature range. The measurement results are given in FIG. 7.

Figure 7:
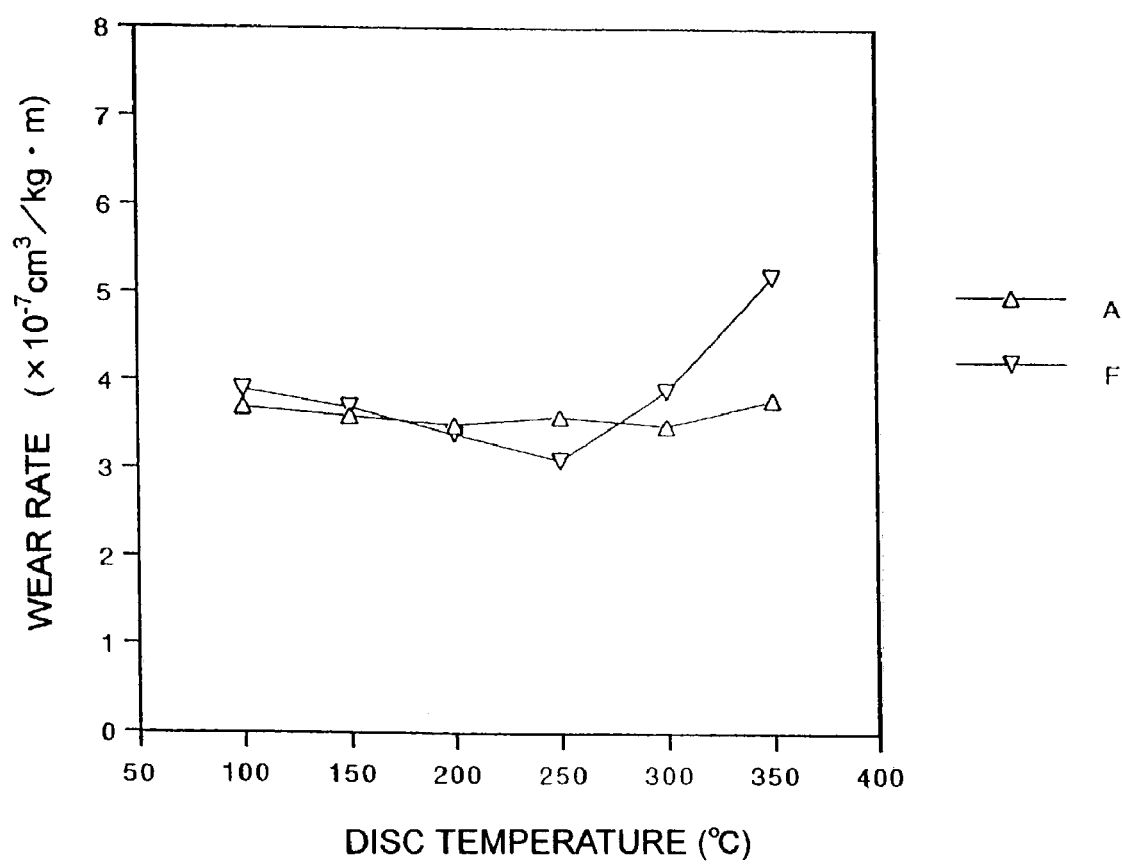
FIG. 7 is a graph showing a relationship between a disc pad temperature and a wear rate for the disc pads A and F.

As can be appreciated from FIG. 7, the disc pad A shows the reduced wearability at a high temperature range, i.e., the superior wear resistance.

EXAMPLE 3

Synthesis of KTMO of the present invention:

KTMO-a obtained in (1) of Example 1 was used to prepare 80 liters of a 2% aqueous slurry to which 126 g of a 76% aqueous solution of sulfuric acid was subsequently added. The slurry was stirred for 2 hours and then adjusted to a pH of 8.5. This aqueous slurry was subjected to treatment by a centrifugal separator. The resulting cake (solids) was dispensed, dried at 110° C. for 5 hours and then calcined at 600° C. for 12 hours in an electric furnace. The calcined product was cooled gradually and then passed through a 20 mesh screen to obtain a white powder with an arithmetic mean of major and minor diameters of 3 μm, a mean thickness of 300 nm and a proportion of a major to minor diameter of 1.5. The white powder was identified as having a composition of $K_{0.7}Mg_{0.4}Ti_{1.6}O_{3.95}$ by fluorescent X-ray analysis using an FP method. Also, its melting point was found to be about 1,372° C.

EXAMPLE 4

Synthesis of KTMO of the present invention:

KTMO-a obtained in (1) of Example 1 was used to prepare 80 liters of a 2% aqueous slurry to which 189 g of a 76% aqueous solution of sulfuric acid was subsequently added. The slurry was stirred for 2 hours and then adjusted to a pH of 8.0. This aqueous slurry was subjected to treatment by a centrifugal separator. The resulting cake (solids) was dispensed, dried at 110° C. for 5 hours and then calcined at 600° C. for 12 hours in an electric furnace. The calcined product was cooled gradually and then passed through a 20 mesh screen to obtain a white powder with an arithmetic mean of major and minor diameters of 3 m, a mean thickness of 300 nm and a proportion of a major to minor diameter of 1.5. The white powder was identified as having a composition of $K_{0.6}Mg_{0.4}Ti_{1.6}O_{3.9}$ by fluorescent X-ray analysis using an FP method.

Figure 10:
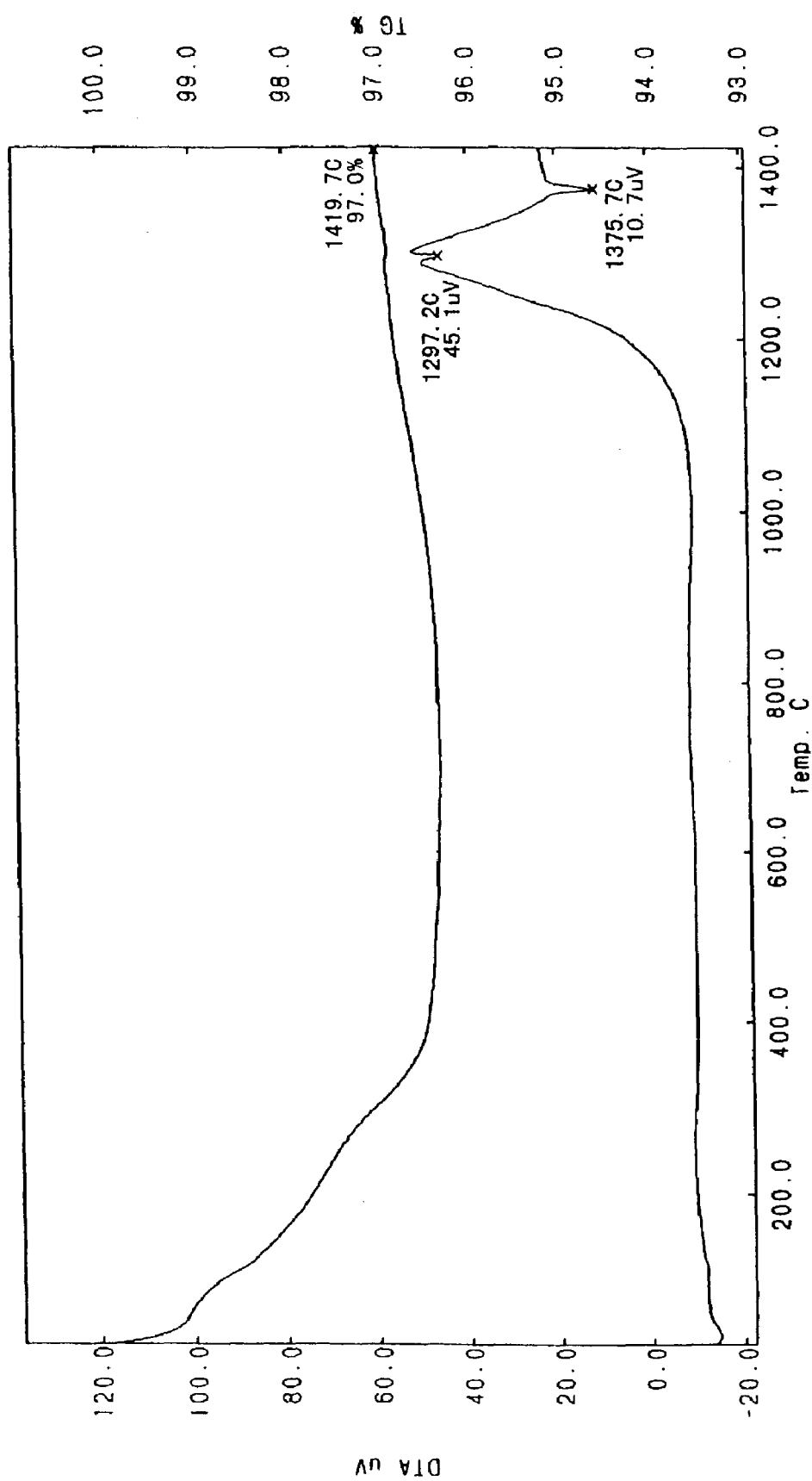
FIG. 10 is a thermal analysis chart of lepidocrocite potassium magnesium titanate of the present invention.

FIG. 10 is a thermal analysis chart of the obtained white powder. As can be seen from FIG. 10, its melting point was about 1,375° C.

UTILITY IN INDUSTRY

The present invention provides novel lepidocrocite potassium magnesium titanate suitable for use as a friction control agent.

The friction material of the present invention contains the above lepidocrocite potassium magnesium titanate as a friction control agent and can be suitably used for braking members, e.g., clutch facings and brake linings incorporated in braking devices as of automobiles, aircrafts, railway vehicles and industrial apparatuses.

The invention claimed is:

1. A lepidocrocite potassium magnesium titanate having a composition represented by the formula $K_{0.2-0.5}Mg_{0.4}Ti_{1.6}O_{3.7-4}$.

2. The lepidocrocite potassium magnesium titanate as recited in claim 1, comprising an arithmetic mean of major and minor diameters of 0.1-100 μm, a proportion of a major to minor diameter of from 1 to below 5, a mean thickness of 50-5,000 nm and a flaky shape.

3. A method for manufacturing the lepidocrocite potassium magnesium titanate as recited in claim 1, comprising the steps of:

adding an acid to an aqueous slurry of lepidocrocite potassium magnesium titanate having a composition represented by the formula $K_{0.8}Mg_{0.4}Ti_{1.6}O_4$ so that the slurry is adjusted to a pH of 6-9;

separating solids from the slurry; and calcining the solids.

4. A method for manufacturing the lepidocrocite potassium magnesium titanate as recited in claim 2, comprising the steps of:

adding an acid to an aqueous slurry of lepidocrocite potassium magnesium titanate having a composition represented by the formula $K_{0.8}Mg_{0.4}Ti_{1.6}O_4$ so that the slurry is adjusted to a pH of 6-9;

separating solids from the slurry; and calcining the solids.

5. A friction control agent comprising the lepidocrocite potassium magnesium titanate of claim 1.

6. A friction control agent comprising the lepidocrocite potassium magnesium titanate of claim 2.

7. A friction material comprising 1-80% by weight of the lepidocrocite potassium magnesium titanate of claim 1.

8. A friction material comprising 1-80% by weight of the lepidocrocite potassium magnesium titanate of claim 2.

9. A friction control agent comprising lepidocrocite potassium magnesium titanate having a composition represented by the formula $K_{O.2-0.7}Mg_{0.4}Ti_{1.6}O_{3.7-4}$.

10. A friction material comprising 1-80% by weight of lepidocrocite potassium magnesium titanate having a composition represented by the formula $K_{0.2-0.7}Mg_{0.4}Ti_{1.6}O_{3.7-4}$.

11. The friction material of claim 10, further comprising 5-60% by weight of a binder and 1-60% by weight of a fibrous substance.

12. A method for manufacturing a lepidocrocite potassium magnesium titanate having a composition represented by the formula $K_{0.2-0.7}Mg_{0.4}Ti_{1.6}O_{3.7-4}$ comprising the steps of:

adding an acid to an aqueous slurry of lepidocrocite potassium magnesium titanate having a composition represented by the formula $K_{0.8}Mg_{0.4}Ti_{1.6}O_4$ so that the slurry is adjusted to a pH of 6-9;

separating solids from the slurry; and calcining the solids.

13. The method for manufacturing the lepidocrocite potassium magnesium titanate as recited in claim 12, characterized in that the slurry is adjusted to a pH of 6.5-8.5.

14. A friction control agent comprising the lepidocrocite potassium magnesium titanate manufactured by the method of claim 12.

15. A friction control agent comprising the lepidocrocite potassium magnesium titanate manufactured by the method of claim 13.

16. A friction material comprising 1-80% by weight of the lepidocrocite potassium magnesium titanate manufactured by the method of claim 12.

17. A friction material comprising 1-80% by weight of the lepidocrocite potassium magnesium titanate manufactured by the method of claim 13.

* * * * *